(12) United States Patent
Ganga et al.

(10) Patent No.: US 10,205,667 B2
(45) Date of Patent: Feb. 12, 2019

(54) CREDIT FLOW CONTROL FOR ETHERNET (71) Applicant: Intel Corporation, Santa Clara, AZ (US)

(72) Inventors: Ilango Ganga, Cupertino, CA (US); Alain Gravel, Thousand Oaks, CA (US); Thomas D. Lovett, Portland, OR (US); Radia Perlman, Redmond, WA (US); Greg Regnier, Portland, OR (US); Anil Vasudevan, Portland, OR (US); Hugh Wilkinson, Newton, MA (US)

(73) Assignee: Intel Corporation, Santa Clara, CA (US)

(*) Notice: Subject to any disclaimer, the term of this patent is extended or adjusted under 35 U.S.C. 154(b) by 57 days.

(21) Appl. No.: 15/614,455

(22) Filed: Jun. 5, 2017

(65) Prior Publication Data

US 2017/0272370 A1  Sep. 21, 2017

Related U.S. Application Data (63) Continuation of application No. 14/313,740, filed on Jun. 24, 2014, now Pat. No. 9,674,098.

(60) Provisional application No. 61/842,339, filed on Jul. 2, 2013.

(51) Int. Cl.
*H04L 12/851* (2013.01)
(52) U.S. Cl.
CPC .......... *H04L 47/2441* (2013.01); *Y02D 30/30* (2018.01); *Y02D 30/32* (2018.01)

(58) Field of Classification Search
CPC ..... H04L 47/2441; H04L 47/39; H04L 47/30; H04L 47/10; H04L 47/12; H04L 47/365
See application file for complete search history.

(56) References Cited

U.S. PATENT DOCUMENTS

| 8,630,202 B2 | 1/2014 | Kim | |
|---|---|---|---|
| 2003/0026206 A1* | 2/2003 | Mullendore | H04L 47/10 370/230 |
| 2004/0027987 A1 | 2/2004 | Bergamasco | |
| 2007/0171830 A1* | 7/2007 | Vulkan | H04J 3/0632 370/235 |
| 2009/0016218 A1 | 1/2009 | Hong | |
| 2009/0279558 A1* | 11/2009 | Davis | H04L 45/00 370/412 |

(Continued)

OTHER PUBLICATIONS

Office Action issued in U.S. Appl. No. 14/313,740, dated Jan. 11, 2016, 22 pages.

(Continued)

*Primary Examiner* — Jamal Javaid
(74) *Attorney, Agent, or Firm* — Grossman, Tucker, Perreault & Pfleger, PLLC (57) ABSTRACT

One embodiment provides a method for enabling class-based credit flow control for a network node in communication with a link partner using an Ethernet communications protocol. The method includes receiving a control frame from the link partner. The control frame includes at least one field for specifying credit for at least one traffic class and the credit is based on available space in a receive buffer associated with the at least one traffic class. The method further includes sending data packets to the link partner based on the credit, the data packets associated with the at least one traffic class.

25 Claims, 9 Drawing Sheets (56) References Cited

U.S. PATENT DOCUMENTS

2009/0303876 A1  12/2009  Wu

OTHER PUBLICATIONS

Final Office Action issued in U.S. Appl. No. 14/313,740, dated Aug. 11, 2016, 16 pages.
Notice of Allowance issued in U.S. Appl. No. 14/313,740, dated Jan. 31, 2017, 10 pages.

* cited by examiner

CREDIT FLOW CONTROL FOR ETHERNET

CROSS-REFERENCE TO RELATED APPLICATION(S)

The present application is a continuation of U.S. patent application Ser. No. 14/313,740, filed Jun. 24, 2014 which claims the benefit, under 35 USC 119(e), of U.S. Provisional Application Ser. No. 61/842,339, filed Jul. 2, 2013, both of which are hereby incorporated by reference in their entirety.

FIELD

The present disclosure relates to an Ethernet network system configured for class-based credit flow control.

BACKGROUND

Currently, IEEE Ethernet Specifications 802.3 and 802.1Q specify flow control mechanisms that employ link pause and priority flow control (PFC). These flow control mechanisms are reactionary in nature. The receiving station sends a pause frame when it runs out of buffer space to receive frames. The transmitter does not have any advance notice of buffer levels so there is less time to react to congestion scenarios and buffer utilization efficiency may be decreased. This may be particularly problematic in applications that require higher performance interconnections.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

The present disclosure describes a class-based credit flow control mechanism for Ethernet. The credit flow control mechanisms described herein may be used in higher performance applications like storage, high performance computing (HPC), and Ethernet based fabric interconnects, etc. Applying credit based flow control technique to Ethernet allows for pro-active congestion control that that enables more efficient use of buffer space. In credit based flow control, credits are provided by the receiving station, based on the available buffer space, to the transmitting station. The transmitting station is aware of the receiver buffer levels and sends frames as long as there are available credits for transmission. Moreover, credit based congestion control is better at alleviating congestion spreading because the sending station has prior information of the receiver buffer levels and can anticipate and proactively deal with congestion scenarios. The credit based flow control allows for efficient use of frame buffers and improves the handling of congestion scenarios in higher speed interconnects and storage applications.

This disclosure provides advantages over conventional Ethernet flow control. For example, the teachings presented herein provide a class-based credit flow control mechanism for proactive congestion management in Ethernet based fabric interconnects. In some embodiments, a Media Access Control (MAC) control frame format may be used for exchanging credit between peer stations. In some embodiments, an alternate control frame format may be used for exchanging credit between peer stations and may be used with an enhanced Ethernet frame format specifically proposed for use in higher speed fabric interconnects. In some embodiments, Link Layer Discovery Protocol (LLDP) based configuration may be used to enable or establish credit based flow control between stations. The present teachings also provide the ability to maintain compatibility with basic Ethernet mechanisms like frame format, encoding, and layering concepts, to take advantage of the breadth of existing Ethernet MAC and Physical Layer (PHY) ecosystems. The term "ecosystem," as used in the present disclosure, encompasses protocols, interfaces, components, devices, and systems and methods related to the interconnection of these components to build Ethernet based systems.

Figure 1:
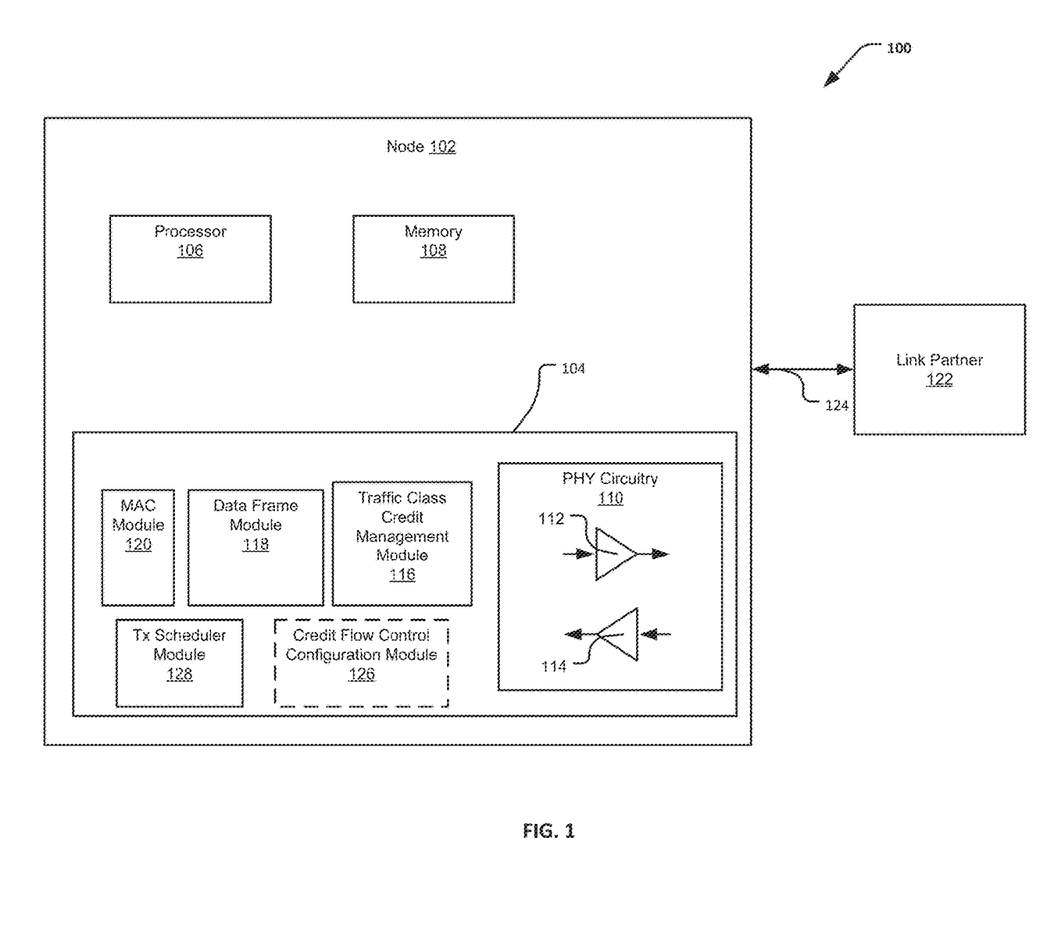
FIG. 1 illustrates a network system consistent with various embodiments of the present disclosure.

FIG. 1 illustrates a network system 100 consistent with various embodiments of the present disclosure. Network system 100 generally includes at least one network node element 102 and at least one link partner 122, each configured to communicate with one another via communications link 124. The node 102 and link partner 122 may form part of a network fabric. The network node element 102 and the link partner 122 may communicate with each other, via link 124, using, for example, an Ethernet communications protocol. The Ethernet communications protocol may be capable of providing communication for other upper layer protocols such as, for example, Transmission Control Protocol/Internet Protocol (TCP/IP), User Datagram Protocol (UDP), Stream Control Transmission Protocol (SCTP), etc. The Ethernet protocol may comply with or be compatible with the Ethernet standard published by the Institute of Electrical and Electronics Engineers (IEEE) titled "IEEE 802.3 Standard," published in March, 2002 and/or later versions of this standard, for example, the IEEE 802.3 Standard for Ethernet, published 2012. In other embodiments, the network node element 102 and the link partner 122 may communicate with each other, via link 124, using, for example, a custom and/or proprietary communications protocol, such as that described in at least one embodiment herein. The link partner 122 and/or node element 102 may represent a computer node element (e.g., host server system, laptop, tablet, workstation, etc.), switch, router, hub, network storage device, network attached device, non-volatile memory (NVM) storage device, etc. The node 102 includes a network controller 104 (e.g., network interface card (NIC), etc.), a system processor 106 (e.g., multi-core general purpose processor, such as those provided by Intel Corp., etc.) and system memory 108. The link partner 122 may be configured and operate in a similar manner as the node 102, as described in greater detail below.

The network controller 104 includes PHY circuitry 110 generally configured to interface the node 102 with the link partner 122, via communications link 124. PHY circuitry 110 may comply with or be compatible with, the aforementioned IEEE 802.3 Ethernet communications protocol, which may include, for example, 10GBASE-T, 10GBASE-KR, 40GBASE-KR4, 40GBASE-CR4, 100GBASE-CR10, 100GBASE-CR4, 100GBASE-KR4, and/or 100GBASE-KP4 and/or other PHY circuitry that is compliant with the aforementioned IEEE 802.3 Ethernet communications protocol and/or compliant with an after-developed communications protocol. PHY circuitry 110 includes transmit circuitry (Tx) 112 configured to transmit data packets and/or frames to the link partner 122, via link 124, and receive circuitry (Rx) 114 configured to receive data packets and/or frames from the link partner 122, via link 124. Of course, PHY circuitry 110 may also include encoding/decoding circuitry (not shown) configured to perform analog-to-digital and digital-to-analog conversion, encoding and decoding of data, analog parasitic cancellation (for example, cross talk cancellation), and recovery of received data. Rx circuitry 114 may include phase lock loop circuitry (PLL, not shown) configured to coordinate timing of data reception from the link partner 122. The communications link 124 may comprise, for example, a media dependent interface that may include, for example, copper twin-axial cable, backplane traces on a printed circuit board, fiber optic cable, copper twisted pair cable, etc. In some embodiments, the communications link 124 may include a plurality of logical and/or physical channels (e.g., differential pair channels) that provide separate connections between, for example, the Tx and Rx 112/114 of the node 102 and an Rx and Tx, respectively, of the link partner 122.

Node 102 and link partner 122 may each be configured to control the traffic for different applications utilizing the link 124 based on a plurality of "traffic classes." A traffic class may be defined as a quality of service (QoS) level that may be defined apriori between the node element 102 and the link partner 122. More generally, a traffic class may represent a categorization of computer network traffic. For example, certain applications (e.g., voice/video) may require a certain level of packet throughput to operate properly, while other applications like general web browsing and email may not require the throughput of voice and/or video applications. Thus, the node 102 and link partner 122 may establish a plurality of traffic classes so that, for example, packet transfers in one traffic class may take priority over transfers from another class. Also, certain traffic, e.g., storage traffic, may be assigned a separate traffic class that may require no packet loss characteristics while other traffic classes may be serviced in best effort manner. Flow control or congestion management may be enabled in certain traffic classes that require no packet loss behavior, etc. In other embodiments, a fabric manager (not shown) may be configured to establish traffic classes for the node 102 and/or link partner 122. The node 102 may include a plurality of receive buffers and transmit buffers (not shown in the Figure) which may be implemented in memory 108. In the embodiments presented herein, the node 102 is configured for credit flow control to manage receive buffers for traffic received from the link partner 122. "Credit flow control" as used herein is a mechanism to assign credits for available space in receive buffers and to base packet transmission on credits. Receive and transmit buffers may be assigned for each traffic class and, in the embodiments presented herein, credit flow control may be based on a plurality of traffic classes.

Accordingly, network controller 104 also includes a traffic class credit management module 116 configured to determine the number of credits available for at least one receive buffer in at least one traffic class. In addition, module 116 is configured to define a credit counter for at least one traffic class and update the credit counter (e.g., to monitor or track credits) based on information received from the link partner 122. The network controller also includes a data frame module 118 configured to modify, during a data mode, a conventional Ethernet data frame with information related to traffic class-based credit flow control. Network controller 104 also includes a media access control (MAC) module 120 configured to provide addressing and channel access control protocols for communication with the link partner 122, as may be defined by the aforementioned Ethernet communications protocol (e.g., MAC module 120 may be a Layer 2 device). The MAC module 120 is generally configured to periodically generate a MAC control frame with information related to traffic class-based credit flow control and available credits of the receiving link partner 122. Network controller also includes a Tx (transmit) scheduler module 128 configured to schedule frames in each traffic class for transmission based on available credits, for example when a traffic class is configured to use credit flow control. In some embodiments, certain traffic classes may be enabled for credit flow control while other traffic classes may be enabled for conventional flow control mechanisms, e.g., PFC. The traffic classes, scheduling functions etc., may comply or be compatible with traffic classes, scheduling functions, etc. as defined in the "IEEE Std 802.1Q-2005" standard, titled "Virtual Bridged Local Area Networks," published in May, 2006 and/or later versions of this standard. In some embodiments, network controller 104 may also include a credit flow control configuration module 126 configured to exchange defined configuration frames (e.g., LLDP frames with TLV for credit flow control configuration) with the link partner 122 to enable and define the parameters of traffic class-based credit flow control.

Figure 2:
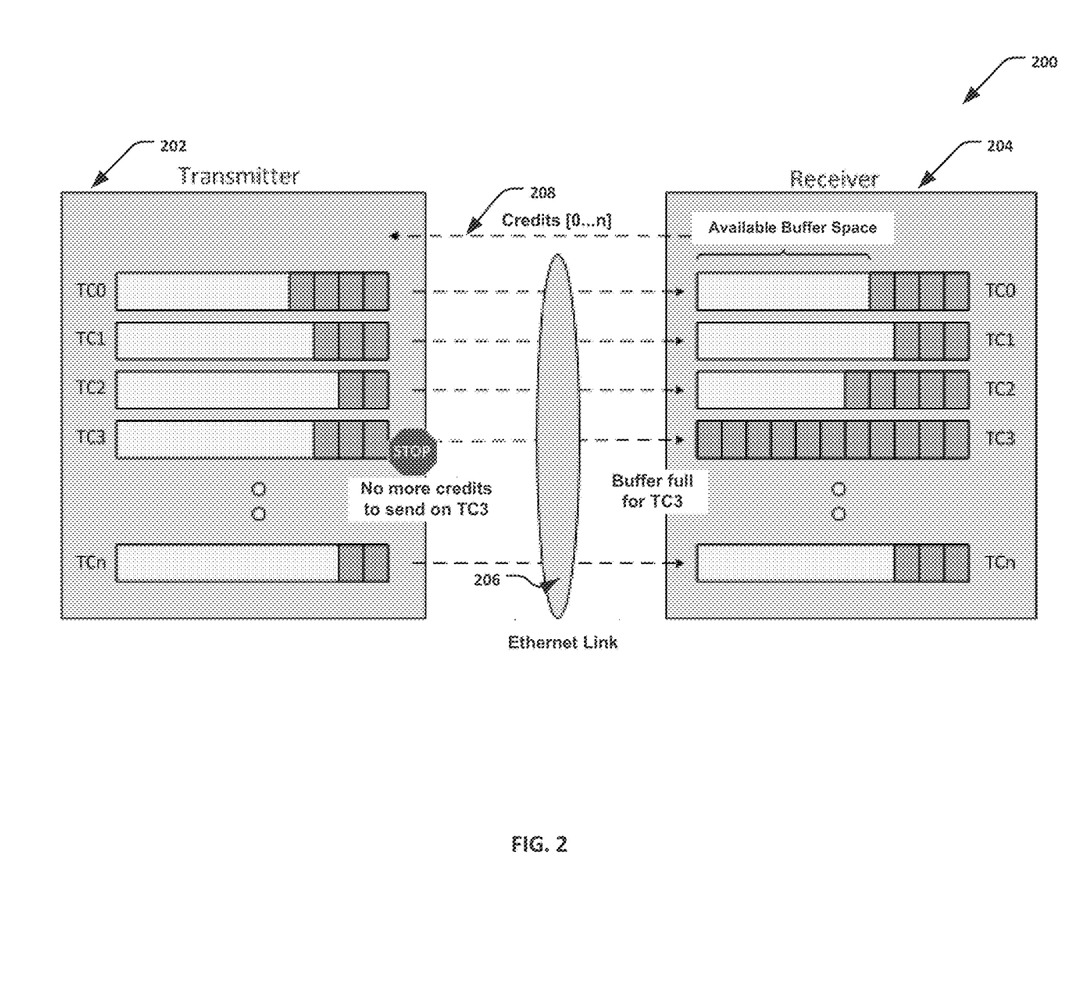
FIG. 2 illustrates the general concepts of traffic class-based credit flow control according to embodiments of the present disclosure.

Before describing the details of various embodiments of traffic class-based credit flow control, FIG. 2 illustrates the general concepts of traffic class-based credit flow control 200 according to the teachings presented herein. In the example of FIG. 2, a transmitter 202 (e.g., a transmitter of link partner 122) is configured to transmit packets/frames to a receiver 204 (e.g., a receiver of node 102). It will be appreciated that this represents one side of a full duplex connection to simplify the description. Class-based credit flow control may also operate in the reverse direction (e.g., from a transmitter of node 102 to a receiver of link partner 122).

A plurality of classes TC0, TC1, TC2, TC3, . . . , TCn are defined between the transmitter and receiver (and generally indicated as reference numeral 206). In operation, the receiver 204 is configured to assign receive buffer space for each respective traffic class. In addition, the receiver is configured to monitor the available receive buffer space and, based on the available buffer space, determine a credit. In this context, a credit is generally a value that is based on the available buffer space. The receiver is further configured to periodically transmit credit information 208 to the remote transmitter representing available buffer space for each traffic class. To prevent buffer overruns, etc., the transmitter 202 is configured to send frames to the receiver only if there is enough credit for transmitting a frame for that traffic class. Accordingly, the transmitter 202 may be configured to determine if a send frame size (in bytes) is less than the number of available credits (N)×Bytes per Credit (B). If the send frame size exceeds this threshold, as illustrated for traffic class TC3, the transmitter 202 stops frame transmission. The receiver 204 may be configured to determine credits per traffic class (TC) and sends the credits periodically (at time interval T) to the transmitter 204. The receiver 204 may determine the number of Credits (N) based on available buffer space (per traffic class)÷ Bytes Per Credit (B). The initial values of N, B, and T may be configured by network management at the time of fabric initialization and/or during fabric reconfigurations. The transmitter 202 is configured to update credit counters each time it receives credit information 208 from the remote receiver 204. The credit counter may be updated based on received credits from the receiver 204 and offset by the credits for any frame in transit and/or a trip delay (e.g., 2× round trip delay rounded off to nearest credit quanta, where Credit Quanta=1 unit of Credit=B bytes). The credit counter may be decremented every time the transmitter sends a frame. The decrement value may be based on Frame Size in Bytes/Bytes per credit. These concepts will be described in greater detail below.

Credit Flow Control Using IEEE 802.3-Compatible Frame Formats

Figure 3:
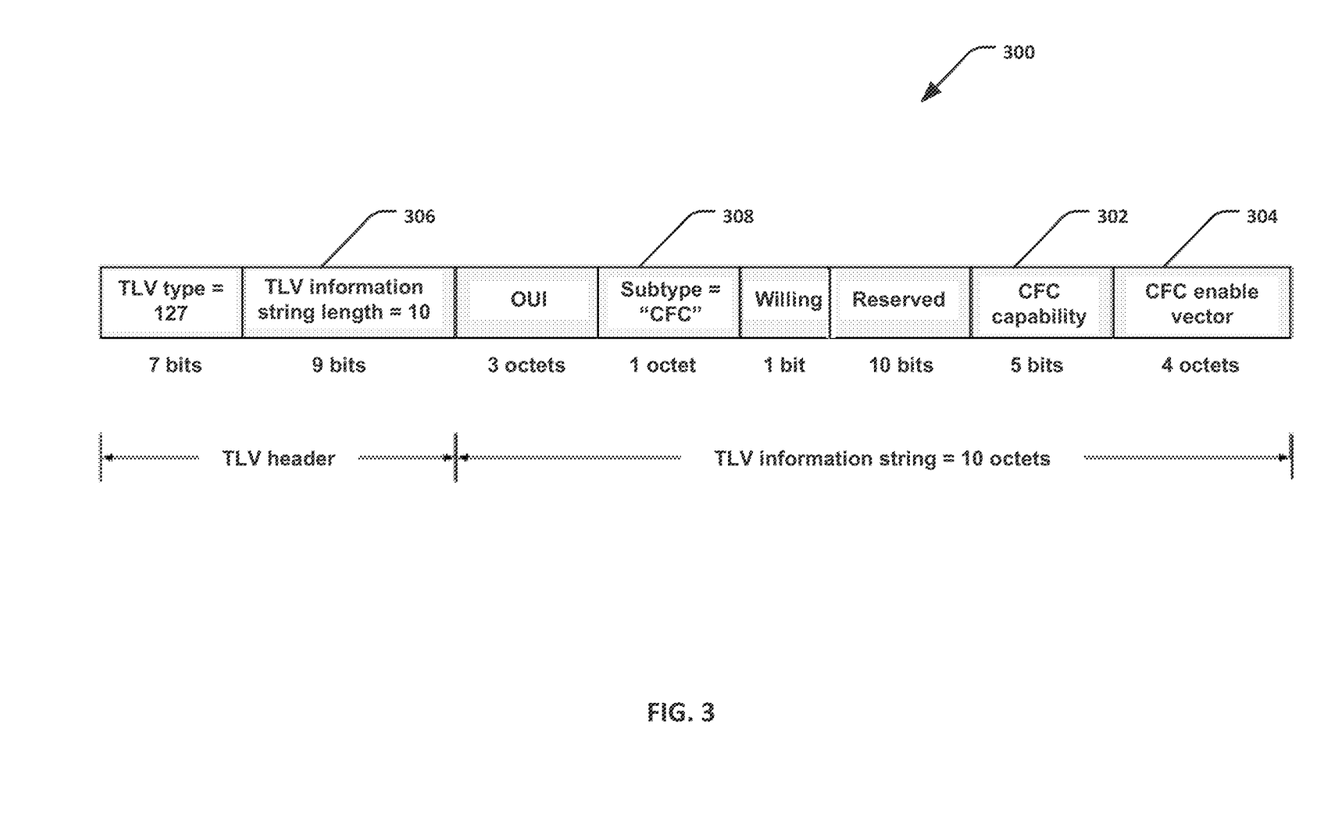
FIG. 3 illustrates an LLDP frame having a type linked value (TLV) frame format according to one embodiment of the present disclosure.

With continued reference to FIGS. 1 and 2, traffic class-based credit flow control of at least one embodiment generally includes configuring each node to enable traffic class-based credit flow control, exchanging credit flow control information during a data mode using data frames, and periodically exchanging control frames to update available credit information and for updating credit counters. FIG. 3 illustrates an LLDP frame having a type length value (TLV) format 300 according to one embodiment of the present disclosure. The LLDP frame 300 is generated by the module 126 (FIG. 1). The LLDP frame with TLV 300 may be exchanged between the node 102 and the link partner 122 when the link 124 is initialized and/or when there is a configuration change. The LLDP frame with TLV 300 of this embodiment may be generally compatible with a LLDP frame as may be defined by the "IEEE Std 802.1AB-2005" standard, titled "IEEE Standard for Local and metropolitan area networks—Station and Media Access Control Connectivity Discovery," published in April, 2005 and/or later versions of this standard. The TLV format may be consistent with the TLV definitions for Data Center Bridging Exchange (DCBX) protocol as specified in the "IEEE Std 802.1Qaz-2011" standard, titled "IEEE Standard for Local and metropolitan area networks—MAC Bridges and Virtual Bridged LANs—Amendment 18: Enhanced Transmission Selection for Bandwidth Sharing Between Traffic Classes," published in September, 2011 and/or later versions of this standard. The LLDP frame with TLV 300 is a configuration frame and generally includes a plurality of fields which may be used to define parameters and configuring each node to enable traffic class-based credit flow control. For example, field 302 may include a bit sequence (e.g., 5-bit) that defines how many traffic classes support credit flow control. For example, if there are 32 traffic classes defined between node 102 and link partner 122, there may be a subset of these traffic classes that support credit flow control. In some embodiments, traffic classes that do not support credit flow control may utilize conventional flow control mechanisms, e.g., link pause or priority flow control (PFC). Priority based flow control and link pause may be disabled on Ethernet links on which credit based flow control is enabled. In cases where both credit flow control and PFC are advertised on the link, credit flow control may take precedence, and only CFC may be enabled on the link. Field 304 may include a vector sequence (e.g., 4 octets) that defines which traffic classe(s) are enabled for credit flow control. The "CFC enable vector" of field 304 may include a bit mask that indicates which of the traffic class(es) are enabled for credit flow control. The size of the fields in frame 300 may be reduced or expanded, depending on the particular operating environment. For example, the TLV 300 may be defined so that up to 32 traffic classes can be configured. The length of the TLV information string field 306 can be reduced to support 8, or 16 traffic classes. For example the "CFC capability" field 302 can be reduced to a 3-bit value for 8 TCs, 4 bit value for 16 TCs, or 5-bit value for 32 TCs. Similarly, the CFC enable vector 304 can be reduced to 1 octet for 8 TCs, or 2 octets for 16 TCs, or 4 octets for 32 TCs. The TLV 300 may be identified by the subtype field 308. The string "CFC" in this field is generally a number that may be assigned by IEEE Working Group, for example, an OUI (organizationally unique identifier) under IEEE 802.1. Otherwise, a proprietary OUI with identifying "CFC" may be used.

Figure 4:
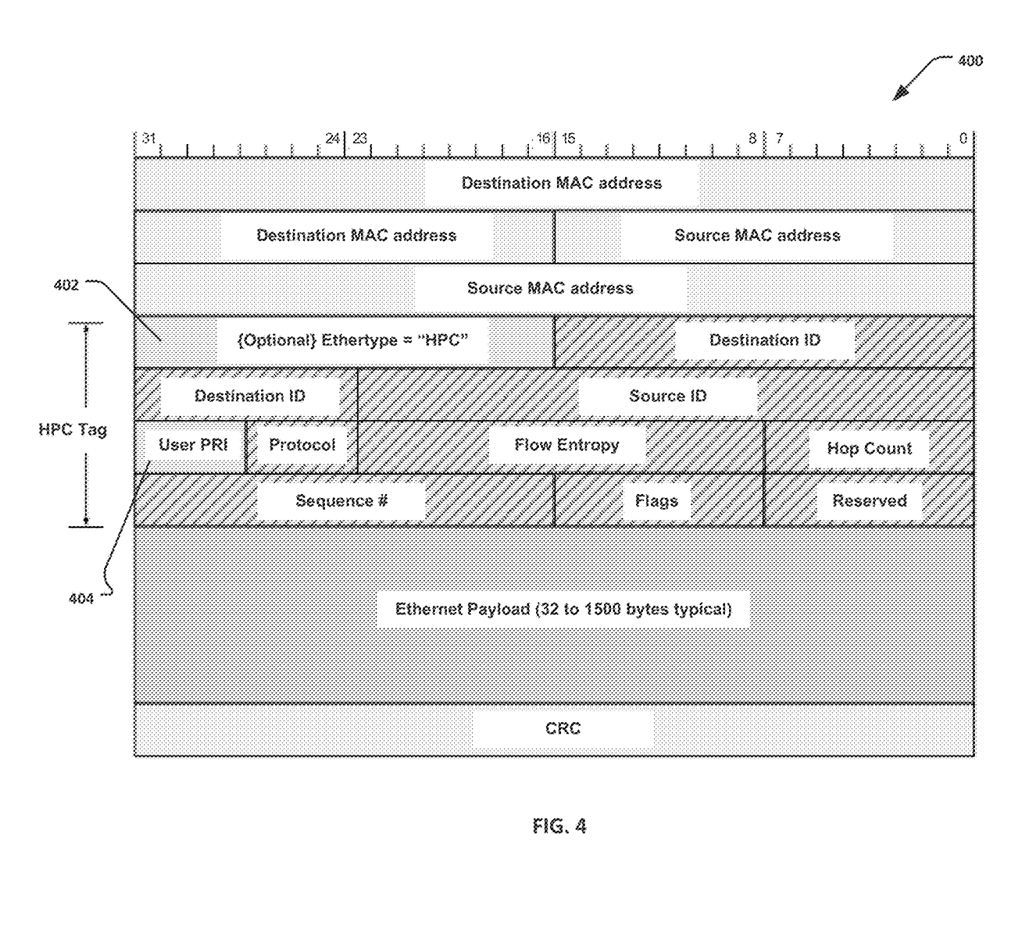
FIG. 4 illustrates a data frame according to one embodiment of the present disclosure.

FIG. 4 illustrates a data frame 400 according to one embodiment of the present disclosure. The data frame 400 may be exchanged by the node 102 and link partner 122 during data mode operations. The data frame 400 is generated by the data frame module 118 (FIG. 1). The data frame 400 of this embodiment is generally compatible with the aforementioned Ethernet communications protocol. The Traffic Class information is indicated through user priority field in 802.1Q VLAN tag that is carried in Ethernet frames. Currently IEEE 802.1Q defines a 3-bit user priority field that supports up to 8 values. Some storage and higher performance fabric interconnect applications may require higher number of traffic classes to be used in the fabric. In contrast, the present embodiment includes an Ethernet header Tag with an Ethertype="HPC" field 402 that carries User Priority value field 404 (in addition to other fields) to represent up to n traffic classes (e.g., 4-bit field to support 16 traffic classes, 5-bit field to support 32 traffic classes, etc.).

Figure 5:
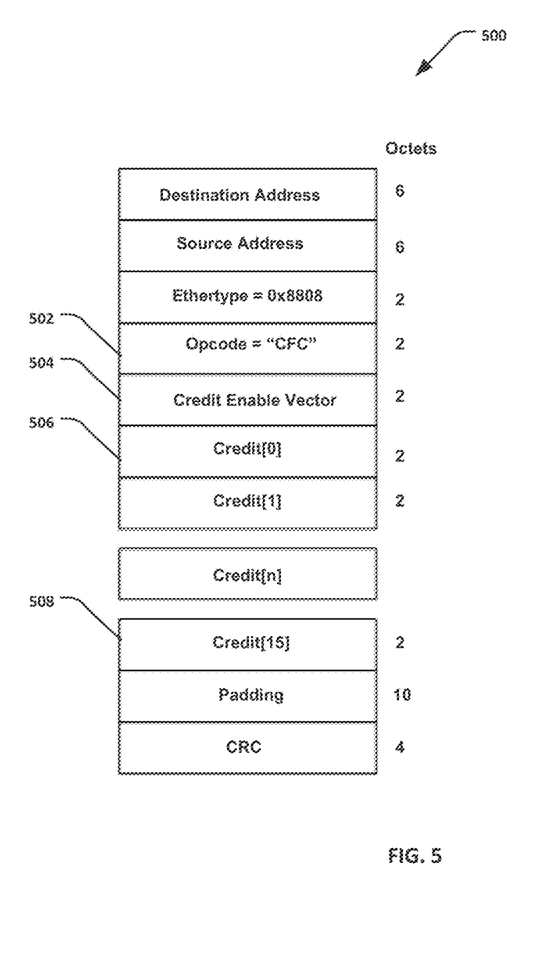
FIG. 5 illustrates a MAC credit flow control frame according to one embodiment of the present disclosure.

FIG. 5 illustrates a MAC credit flow control frame 500 according to one embodiment of the present disclosure. The frame 500 may be generated by the MAC module 120 (FIG. 1) and may be exchanged periodically by the node 102 and link partner to determine available credit of the receiving node and to monitor or track the available credit by the sending node (updating credit counters). The frame 500 may be compatible with an IEEE 802.3 MAC control frame with the following definition for exchanging credits between the stations across the link. The frame 500 may include an opcode="CFC" field entry 502 to indicate that frame 500 is a credit based flow control frame. The credit enable vector field 504 may be used to indicate if the credit vector is valid for the corresponding traffic class. In some embodiments, The CFC frame may define credits for up to 16 traffic classes. Currently IEEE 802.1Q specifies up to 8 traffic classes. Accordingly, the credit enable vector bits may be set to zero for traffic classes that are not defined. Even though the network may support a maximum of up to 8 (or 16) traffic classes, credit flow control may be enabled only on a subset of the traffic classes. In such cases, the credit enable vector indicates credits only for the traffic classes that are enabled for credit flow control. Credit fields 506-508 may be used to indicate how much credit is available in a respective traffic class.

Credit Flow Control Using "Enhanced Ethernet" Frame Formats

Figure 6:
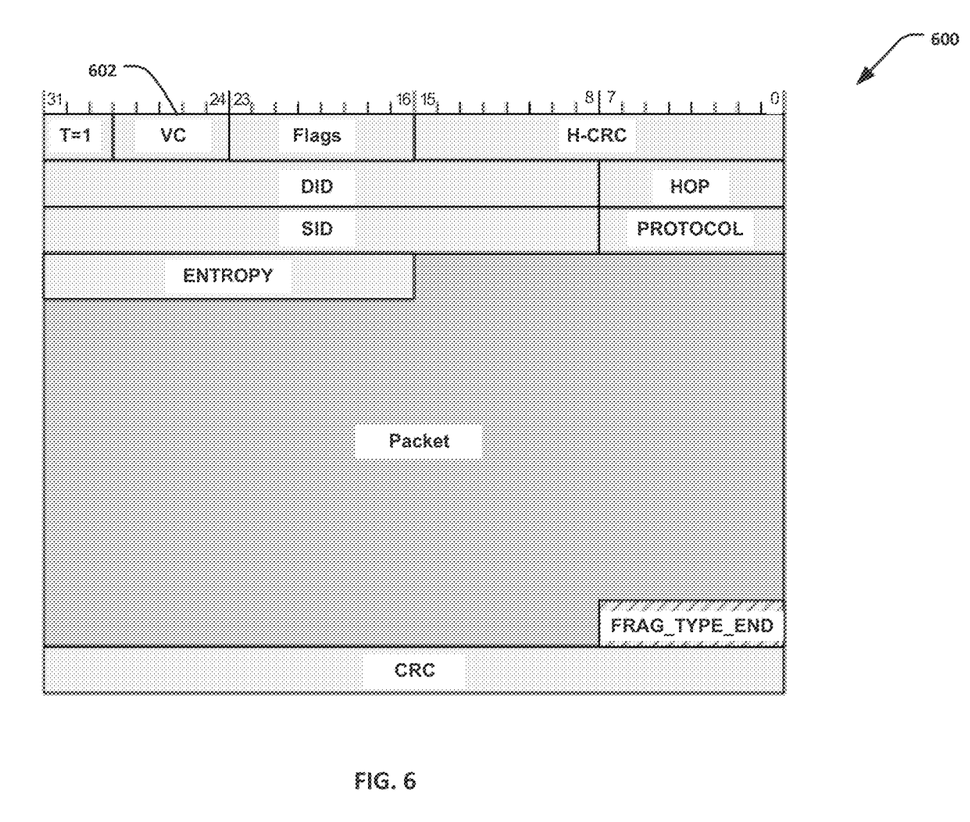
FIG. 6 illustrates a data frame according to one embodiment of the present disclosure.

In this embodiment, enhanced Ethernet frame formats are defined for more efficient forwarding in specialized higher performance fabric interconnect applications. With continued reference to FIGS. 1 and 2, traffic class-based credit flow control of another embodiment generally includes defining a data frame with header fields to send traffic class information and other information to the receiving node. This embodiment also includes defining a control frame for periodically exchanging available credit information and updating credit counters. FIG. 6 illustrates a data frame 600 according to one embodiment of the present disclosure. The frame 600 may include a field 602 (Virtual Channel or VC) that indicates traffic class information that may enable a plurality of traffic classes for credit flow control. The term "Virtual Channel" is often used to describe the segregation of traffic over a link in higher performance fabric interconnects. The term "Traffic Class" or TC, however, is commonly used for representing different classes of traffic on Ethernet networks. For consistency, the term "Traffic Class" will generally be used in the present disclosure and is not meant to limit the applicability of these features (e.g., credit flow control) in any manner.

Figure 7:
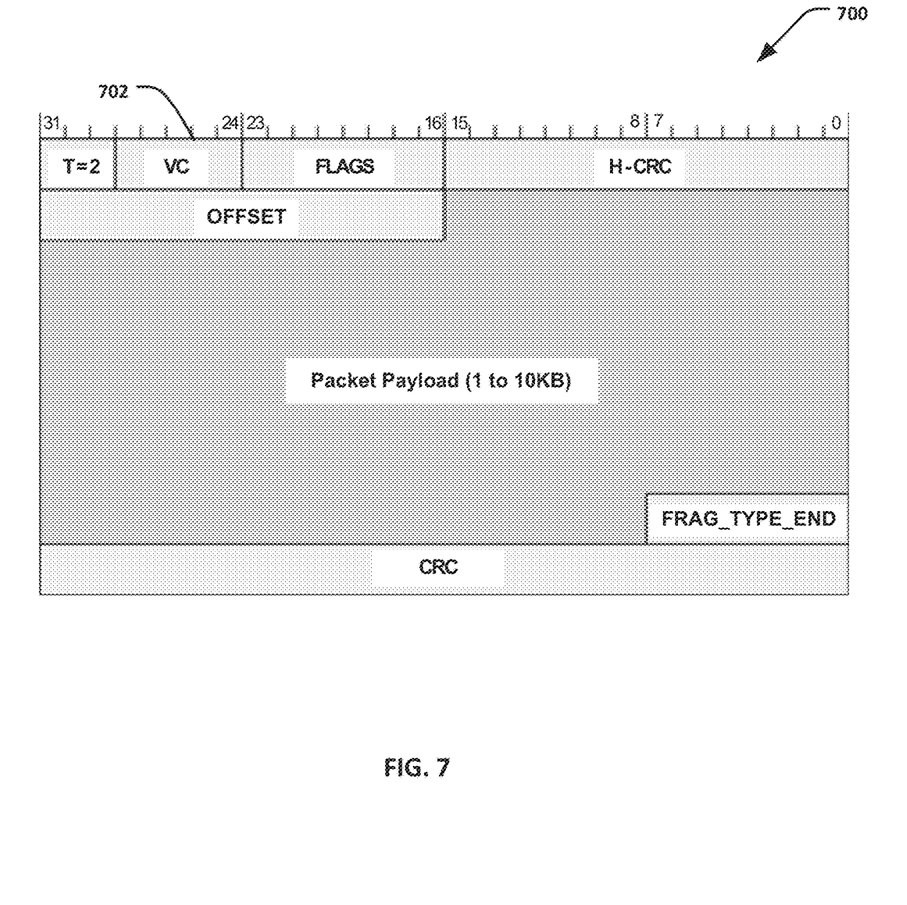
FIG. 7 illustrates a data frame according to one embodiment of the present disclosure.
Figure 8:
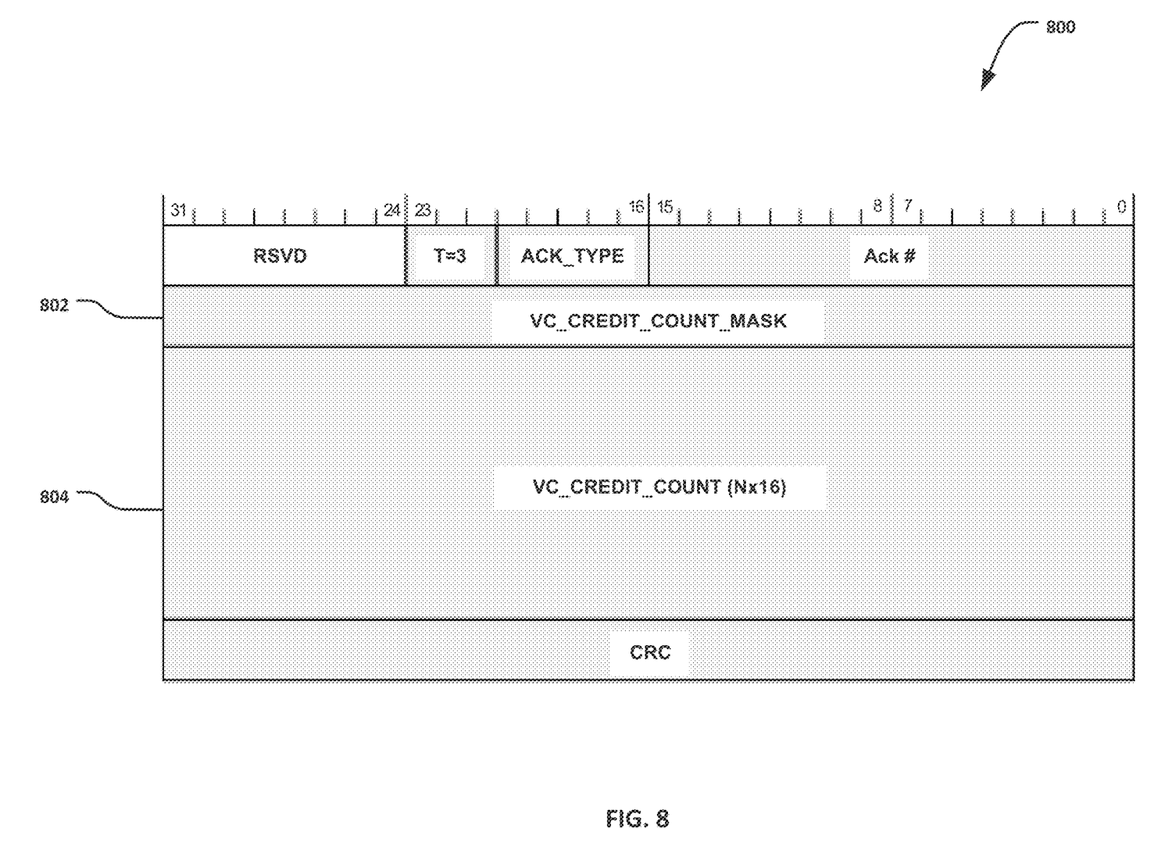
FIG. 8 illustrates a MAC control frame according to one embodiment of the present disclosure.

FIG. 7 illustrates a data frame 700 according to one embodiment of the present disclosure. The frame 700 may include a field 702 (VC) that indicates traffic class information that may enable a plurality of traffic classes for credit flow control. The VC fields 602, 702 are shown as 5 bit fields to support up to 32 traffic classes. Frames 600 and 700 may be used to support frame fragmentation. FIG. 8 illustrates a MAC control frame 800 according to one embodiment of the present disclosure. The frame 800 may include a VC_Credit_Count field 804 that indicates the credit count for each traffic class (e.g., up 32 traffic classes). The frame 800 may also include a VC_Credit_Count_Mask field 802 to identify which credit counts are present and valid in the control frame. The VC_Credit_Count_Mask field 804 is a vector (or bit mask) that indicates if the credit count field is valid for a corresponding traffic class.

Figure 9:
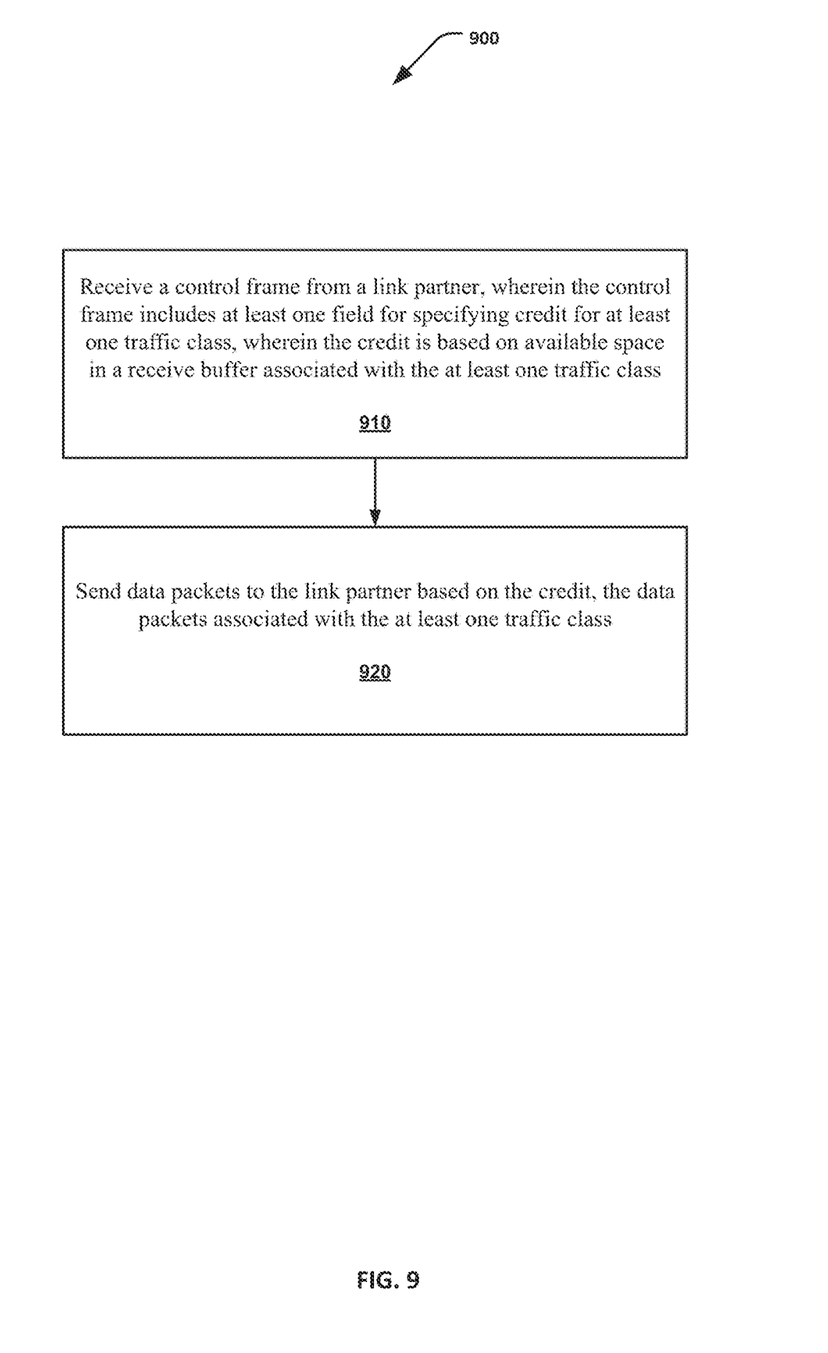
FIG. 9 illustrates a flowchart of operations of one example embodiment consistent with the present disclosure.

FIG. 9 illustrates a flowchart of operations 900 of one example embodiment consistent with the present disclosure. The operations provide a method for enabling class-based credit flow control for a network node in communication with a link partner using an Ethernet communications protocol. At operation 910, a control frame is received from the link partner. The control frame includes at least one field for specifying credit for at least one traffic class. The credit is based on available space in a receive buffer associated with the at least one traffic class. At operation 920, data packets are sent to the link partner based on the credit, the data packets associated with the at least one traffic class.

The foregoing is presented as exemplary system architectures and methodologies, modifications to the present disclosure are possible. The host processor 106 may include one or more processor cores and may be configured to execute system software. System software may include, for example, operating system code (e.g., OS kernel code) and local area network (LAN) driver code. LAN driver code may be configured to control, at least in part, the operation of the network controller 104. System memory may include I/O memory buffers configured to store one or more data packets that are to be transmitted by, or received by, network controller 104. Chipset circuitry may generally include "North Bridge" circuitry (not shown) to control communication between the processor, network controller 104 and system memory 108.

Node 102 and/or link partner 118 may further include an operating system (OS, not shown) to manage system resources and control tasks that are run on, e.g., node 102. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised on a dedicated sub-system such as, for example, a TCP offload engine and/or network controller 104. The TCP offload engine circuitry may be configured to provide, for example, packet transport, packet segmentation, packet reassembly, error checking, transmission acknowledgements, transmission retries, etc., without the need for host CPU and/or software involvement.

The system memory 108 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable memory.

Embodiments of the operations described herein may be implemented in a system that includes one or more tangible computer readable storage mediums having stored thereon, individually or in combination, instructions that when executed by one or more processors perform the methods. The processor may include, for example, a processing unit and/or programmable circuitry in the network controller 104, system processor 106 and/or other processing unit or programmable circuitry. Thus, it is intended that operations according to the methods described herein may be distributed across a plurality of physical devices, such as processing structures at several different physical locations. The storage medium may include any type of tangible, non-transitory storage medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage media suitable for storing electronic instructions.

"Circuitry," as used in any embodiment herein, may comprise, for example, singly or in any combination, hardwired circuitry, programmable circuitry, state machine circuitry, and/or firmware that stores instructions executed by programmable circuitry. "Module," as used herein, may comprise, singly or in any combination circuitry and/or code and/or instructions sets (e.g., software, firmware, etc.). The circuitry may be embodied as an integrated circuit, such as an integrated circuit chip. Thus, the network controller may be embodied as a stand-alone integrated circuit or may be incorporated as one of several components on an integrated circuit.

Thus, the present disclosure provides systems, devices, methods and computer readable media for enabling class-based credit flow control for a network node in communication with a link partner using an Ethernet communications protocol. The following examples pertain to further embodiments.

According to Example 1 there is provided a network controller to communicate with a link partner. The network controller of this example may include a receiver circuit to receive a control frame from the link partner, and the control frame includes at least one field for specifying credit for at least one traffic class, and the credit is based on available space in a receive buffer associated with the at least one traffic class. The network controller of this example may also include a transmit scheduler module to send data packets to the link partner based on the credit, the data packets associated with the at least one traffic class.

Example 2 may include the elements of the foregoing example, and the receiver circuit is further to receive a data frame from the link partner, and the data frame includes at least one field for specifying credit flow control operations for at least one traffic class.

Example 3 may include the elements of the foregoing example, and the data frame and the control frame are compatible with the Ethernet communications.

Example 4 may include the elements of the foregoing example, and the Ethernet communications conform to the Institute of Electrical and Electronics Engineers IEEE 802.3 (2012 or earlier) Standard for Ethernet.

Example 5 may include the elements of the foregoing example, and the control frame is received periodically based on, at least in part, the size of the receive buffer associated with the at least one traffic class.

Example 6 may include the elements of the foregoing example, and further to generate a configuration frame that includes at least one field for defining at least one parameter related to credit flow control; and the configuration frame is exchanged between the network controller and the link partner when a link between the network controller and the link partner is initialized and/or when there is a configuration change at the network controller or the link partner.

Example 7 may include the elements of the foregoing example, and the configuration frame is a Link Layer Discovery Protocol (LLDP) frame with a Type Length Value (TLV) format.

Example 8 may include the elements of the foregoing example, and further to track the credits available at the link partner for at least one traffic class based on the control frame received from the link partner.

Example 9 may include the elements of the foregoing example, and further to suspend sending packets to the link partner if a frame size of the packet exceeds a threshold, the threshold based on the tracked credits, the suspended packets associated with the traffic class for which the threshold has been exceeded.

Example 10 may include the elements of the foregoing example, and the data frame includes a field for specifying credit flow control operations for up to 32 traffic classes.

Example 11 may include the elements of the foregoing example, and the data frame includes a virtual channel field for specifying credit flow control operations for up to 32 traffic classes.

Example 12 may include the elements of the foregoing example, and the network controller is incorporated in a network node element.

According to Example 13 there is provided a method for enabling class-based credit flow control for a network node in communication with a link partner. The method may include receiving a control frame from the link partner, and the control frame includes at least one field for specifying credit for at least one traffic class, and the credit is based on available space in a receive buffer associated with the at least one traffic class. The method of this example may also include sending data packets to the link partner based on the credit, the data packets associated with the at least one traffic class.

Example 14 may include the operations of the foregoing example, and further include receiving a data frame from the link partner, and the data frame includes at least one field for specifying credit flow control operations for at least one traffic class.

Example 15 may include the operations of the foregoing example, and the data frame and the control frame are compatible with the Ethernet communications.

Example 16 may include the operations of the foregoing example, and the Ethernet communications conform to the Institute of Electrical and Electronics Engineers IEEE 802.3 (2012 or earlier) Standard for Ethernet.

Example 17 may include the operations of the foregoing example, and further include receiving the control frame periodically based on, at least in part, the size of the receive buffer associated with the at least one traffic class.

Example 18 may include the operations of the foregoing example, and further include generating a configuration frame that includes at least one field for defining at least one parameter related to credit flow control; and the configuration frame is exchanged between the network controller and the link partner when a link between the network controller and the link partner is initialized and/or when there is a configuration change at the network controller or the link partner.

Example 19 may include the operations of the foregoing example, and the configuration frame is a Link Layer Discovery Protocol (LLDP) frame with a Type Length Value (TLV) format.

Example 20 may include the operations of the foregoing example, and further include tracking the credits available at the link partner for at least one traffic class based on the control frame received from the link partner.

Example 21 may include the operations of the foregoing example, and further include suspending sending packets to the link partner if a frame size of the packet exceeds a threshold, the threshold based on the tracked credits, the suspended packets associated with the traffic class for which the threshold has been exceeded.

Example 22 may include the operations of the foregoing example, and the data frame includes a field for specifying credit flow control operations for up to 32 traffic classes.

Example 23 may include the operations of the foregoing example, and the data frame includes a virtual channel field for specifying credit flow control operations for up to 32 traffic classes.

According to Example 24 there is provided at least one computer-readable storage medium having instructions stored thereon which when executed by a processor result in the following operations for enabling class-based credit flow control for a network controller in communication with a link partner. The operations may include receiving a control frame from the link partner, and the control frame includes at least one field for specifying credit for at least one traffic class, and the credit is based on available space in a receive buffer associated with the at least one traffic class. The operations may also include sending data packets to the link partner based on the credit, the data packets associated with the at least one traffic class.

Example 25 may include the operations of the foregoing example, and further include the operation of receiving a data frame from the link partner, and the data frame includes at least one field for specifying credit flow control operations for at least one traffic class.

According to Example 26 there is provided a system for enabling class-based credit flow control for a network controller in communication with a link partner. The system may include means for receiving a control frame from the link partner, and the control frame includes at least one field for specifying credit for at least one traffic class, and the credit is based on available space in a receive buffer associated with the at least one traffic class. The system may also include means for sending data packets to the link partner based on the credit, the data packets associated with the at least one traffic class.

Example 27 may include the elements of the foregoing example, and further includes means for receiving a data frame from the link partner, and the data frame includes at least one field for specifying credit flow control operations for at least one traffic class.

According to another example there is provided a system including means to perform a method as described in any of the examples above.

According to another example there is provided at least one computer-readable storage medium having instructions stored thereon which when executed by a processor, cause the processor to perform the operations of the method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A network controller to communicate with a link partner, the network controller comprising:
   data frame circuitry to generate a data frame, the data frame including a virtual channel (VC) field to represent at least one traffic class;
   media access control (MAC) circuitry to generate a MAC credit flow control frame to be exchanged with the link partner to monitor and track available credit, wherein the MAC credit flow control frame includes:
      a VC credit count field to indicate a credit count for the at least one traffic class; and
      a VC credit count mask field to indicate if the credit count is valid for a corresponding traffic class;
   transmit scheduler circuitry to send data packets to the link partner based on the credit, the data packets associated with the at least one traffic class; and
   credit management circuitry to:
      increment at least one counter corresponding to a traffic class for which a received credit was specified; and
      decrement the at least one counter when at least one data packet corresponding to the at least one traffic class is sent to the link partner.

2. The network controller of claim 1, wherein the credit is based on available space in a receive buffer associated with the at least one traffic class.

3. The network controller of claim 2, wherein the MAC credit flow control frame is received periodically based on, at least in part, the available space of the receive buffer associated with the at least one traffic class.

4. The network controller of claim 1, further to generate a configuration frame that includes at least one field for defining at least one parameter related to credit flow control;
   wherein the configuration frame is exchanged between the network controller and the link partner when a link between the network controller and the link partner is initialized and/or when there is a configuration change at the network controller or the link partner.

5. The network controller of claim 1, wherein the VC credit count mask field is a vector or a bit mask.

6. The network controller of claim 1, wherein the VC field comprises 5 bits.

7. The network controller of claim 1, wherein the network controller is incorporated in a network node element.

8. A method for enabling class-based credit flow control for a network controller in communication with a link partner, comprising:
   receiving a media access control (MAC) credit flow control frame, the MAC credit flow control frame including:
      a virtual channel (VC) credit count field to indicate a credit count for at least one traffic class; and
      a VC credit count mask field to indicate if the credit count is valid for a corresponding traffic class;
   incrementing, using credit management circuitry, at least one counter corresponding to the at least one traffic class for which the credit was indicated;
   generating, using data frame circuitry, at least one data frame including a VC field to represent the at least one traffic class;
   sending one or more data packets to the link partner based on the credit, the data packets comprised of one or more data frames associated with the at least one traffic class; and
   decrementing, using the credit management circuitry, the at least one counter when at least one data frame corresponding to the traffic class is sent to the link partner.

9. The method of claim 8, further comprising generating, using MAC circuitry, a MAC credit flow control frame to be exchanged with the link partner.

10. The method of claim 9, further comprising transmitting the generated MAC credit flow control frame to the link partner.

11. The method of claim 8, wherein the credit is based on available space in a receive buffer associated with the at least one traffic class.

12. The method of claim 8, wherein the MAC credit flow control frame is received periodically based on, at least in part, available space of a receive buffer associated with the at least one traffic class.

13. The method of claim 8, further comprising generating a configuration frame that includes at least one field for defining at least one parameter related to credit flow control;

wherein the configuration frame is exchanged between the network controller and the link partner when a link between the network controller and the link partner is initialized and/or when there is a configuration change at the network controller or the link partner.

14. The method of claim 8, further comprising suspending sending data packets to the link partner if a frame size of the packet exceeds a threshold, the threshold based on the tracked credits, the suspended packets associated with the traffic class for which the threshold has been exceeded.

15. The method of claim 8, wherein the VC field comprises 5 bits.

16. At least one non-transitory computer-readable storage medium having instructions stored thereon which when executed by a processor result in the following operations for enabling class-based credit flow control for a network controller in communication with a link partner, comprising:
receive a media access control (MAC) credit flow control frame, the MAC credit flow control frame including:
a virtual channel (VC) credit count field to indicate a credit count for at least one traffic class; and
a VC credit count mask field to indicate if the credit count is valid for a corresponding traffic class;
increment at least one counter corresponding to the at least one traffic class for which the credit was indicated;
generate at least one data frame including a VC field to represent the at least one traffic class;
send one or more data packets to the link partner based on the credit, the data packets comprised of one or more data frames associated with the at least one traffic class; and
decrement, using the credit management circuitry, the at least one counter when at least one data frame corresponding to the traffic class is sent to the link partner.

17. The computer-readable storage medium of claim 16, wherein the instructions, when executed by the processor, result in additional operations comprising:
generate a MAC credit flow control frame to be exchanged with the link partner.

18. The computer-readable storage medium of claim 17, wherein the instructions, when executed by the processor, result in additional operations comprising:
transmit the generated MAC credit flow control frame to the link partner.

19. The computer-readable storage medium of claim 16, wherein the credit is based on available space in a receive buffer associated with the at least one traffic class.

20. The computer-readable storage medium of claim 16, wherein the MAC credit flow control frame is received periodically based on, at least in part, available space of a receive buffer associated with the at least one traffic class.

21. The computer-readable storage medium of claim 16, wherein the instructions, when executed by the processor, result in additional operations comprising:
generate a configuration frame that includes at least one field for defining at least one parameter related to credit flow control;
wherein the configuration frame is exchanged between the network controller and the link partner when a link between the network controller and the link partner is initialized and/or when there is a configuration change at the network controller or the link partner.

22. The computer-readable storage medium of claim 16, wherein the instructions, when executed by the processor, result in additional operations comprising:
suspend sending data packets to the link partner if a frame size of the packet exceeds a threshold, the threshold based on the tracked credits, the suspended packets associated with the traffic class for which the threshold has been exceeded.

23. The computer-readable storage medium of claim 16, wherein the VC field comprises 5 bits.

24. A system for establishing credit-based flow control between a network controller and a link partner, comprising:
a means for receiving a media access control (MAC) credit flow control frame, the MAC credit flow control frame including:
a virtual channel (VC) credit count field to indicate a credit count for at least one traffic class; and
a VC credit count mask field to indicate if the credit count is valid for a corresponding traffic class;
a means for incrementing at least one counter corresponding to the at least one traffic class for which the credit was indicated;
a means for generating at least one data frame including a VC field to represent the at least one traffic class;
a means for sending one or more data packets to the link partner based on the credit, the data packets comprised of one or more data frames associated with the at least one traffic class; and
a means for decrementing the at least one counter when at least one data frame corresponding to the traffic class is sent to the link partner.

25. The system for establishing credit-based flow control between a network controller and a link partner of claim 24, further comprising a means for generating a configuration frame that includes at least one field for defining at least one parameter related to credit flow control;
wherein the configuration frame is exchanged between the network controller and the link partner when a link between the network controller and the link partner is initialized and/or when there is a configuration change at the network controller or the link partner.

* * * * *